United States Patent [19]

Richey et al.

[11] Patent Number: 5,452,437
[45] Date of Patent: Sep. 19, 1995

[54] METHODS OF DEBUGGING MULTIPROCESSOR SYSTEM

[75] Inventors: James M. Richey, Phoenix, Ariz.; George L. Wang, Floral Park, N.Y.

[73] Assignee: Motorola, Inc., Schaumburg, Ill.

[21] Appl. No.: 794,092

[22] Filed: Nov. 18, 1991

[51] Int. Cl.$^6$ ............................................. G06F 11/00
[52] U.S. Cl. ................... 395/182.02; 364/267.91; 364/275.5; 364/DIG. 1; 395/800; 395/183.09; 395/183.1
[58] Field of Search ................. 371/19, 16.1; 364/275.5, 267.91; 395/575

[56] References Cited

U.S. PATENT DOCUMENTS

| | | | |
|---|---|---|---|
| 4,181,940 | 1/1980 | Underwood et al. | 364/200 |
| 4,502,116 | 2/1985 | Fowler et al. | 364/200 |

*Primary Examiner*—Charles E. Atkinson
*Attorney, Agent, or Firm*—Walter W. Nielsen; S. Kevin Pickens

[57] ABSTRACT

In a data processing system comprising a plurality of processing elements coupled to a network, a method of single-stepping the processing elements aids in debugging the system. Only one processing element at a time is permitted to execute N steps while its data output is coupled to the network. Once it's finished executing, a time period greater than the maximum propagation delay time of the network is permitted to pass before stepping a succeeding processing element N steps. In another embodiment, the outputs of all processing elements to the network are first disabled, then all processing elements are allowed to execute N steps. Next the system is halted, and, one at a time, the data output of each processing element is coupled to the network, allowing sufficient time for each processing element's output to propagate through the network before coupling the output of a succeeding processing element.

18 Claims, 12 Drawing Sheets

*81*

| LCR | | | | | | | |
|---|---|---|---|---|---|---|---|
| BIT 7 | 6 | 5 | 4 | 3 | 2 | 1 | BIT 0 |
| X | N/A | TSTEP | N/A | N/A | SR2 | SR1 | SR0 |

| SCAN | |
|---|---|
| 32          8 | 7          0 |
|  | SERIAL SCAN RING ACCESS |

| CR | | | | | | | |
|---|---|---|---|---|---|---|---|
| BIT 7 | 6 | 5 | 4 | 3 | 2 | 1 | BIT 0 |
| X | X | X | X | SS | UHLT | N/A | N/A |

| SCR | | | | | | | |
|---|---|---|---|---|---|---|---|
| BIT 7 | 6 | 5 | 4 | 3 | 2 | 1 | BIT 0 |
| SYNC ENABLE | X | X | X | SS | UHLT | N/A | N/A |

*FIG. 15*

| 85 | | | |
|---|---|---|---|
| STEP | | | |
| 32      24 | 23      16 | 15      8 | 7      0 |
|  |  |  |  |

*FIG. 16*

| 86 | | | | | | | |
|---|---|---|---|---|---|---|---|
| HEN | | | | | | | |
| BIT 7 | 6 | 5 | 4 | 3 | 2 | 1 | BIT 0 |
| HESTP | HEDPBP | HEDPE | HEPBE | HEL2BP | HESQF | HEUQF | HESOF |

*FIG. 17*

| 87 | | | | | | | |
|---|---|---|---|---|---|---|---|
| HST | | | | | | | |
| BIT 7 | 6 | 5 | 4 | 3 | 2 | 1 | BIT 0 |
| HSTP | HDPBP | HDPE | HPBE | HL2BP | HSQF | HUQF | HSOF |

*FIG. 18*

| 88 | | | | | | | |
|---|---|---|---|---|---|---|---|
| SR | | | | | | | |
| BIT 7 | 6 | 5 | 4 | 3 | 2 | 1 | BIT 0 |
| N/A | CHLT | SQE | UQE | IFE | IFF | OFE | OFF |

*FIG. 19*

| 89 | | | | | | | |
|---|---|---|---|---|---|---|---|
| SYNC | | | | | | | |
| BIT 7 | | | | | | | BIT 0 |
| | | | | | | | |

*FIG. 20*

| 90 | | | | | | | |
|---|---|---|---|---|---|---|---|
| STOP | | | | | | | |
| BIT 7 | 6 | 5 | 4 | 3 | 2 | 1 | BIT 0 |
| SEND 3 | SEND 2 | SEND 1 | SEND 0 | RECEIVE 3 | RECEIVE 2 | RECEIVE 1 | RECEIVE 0 |

*FIG. 21*

METHODS OF DEBUGGING MULTIPROCESSOR SYSTEM

RELATED INVENTIONS

The present invention is related to the following inventions:

(1) "Data Flow Multiprocessor System", having Ser. No. 07/396,480, filed Aug. 21, 1989, assigned to the Massachusetts Institute of Technology and issued as U.S. Pat. No. 5,241,635 entitled TAGGED TOKEN DATA PROCESSING SYSTEM WITH OPERAND MATCHING IN ACTIVATION FRAMES.

(2) "Synchronization Network For Multiprocessing System", having Ser. No. 07/688,215, filed on Apr. 22, 1991, assigned to the assignee of the present invention.

TECHNICAL FIELD

This invention relates generally to data processing systems and, in particular, to methods of debugging a multiprocessing system.

BACKGROUND OF THE INVENTION

Debugging of the hardware can be both a complex and creative task in the development of a computer system. This task is particularly challenging for multi-processor asynchronous systems because of the difficulty in containing the erroneous data caused by a defect and in obtaining repeatable state transitions into an error state. When a defect is present, we assume that it will introduce a fault which may be observed by inducing the system to traverse into an anomalous error state.

In debugging a multi-processor system, if a fault has occurred in one of the processors, it is desirable to halt the other processors so that the erroneous data will not be spread by the communication network. It is further desirable that we can induce the system into repetitively entering the error state so as to use other means for debugging to locate the source of defect.

The Monsoon multiprocessor system, described in Related Invention No. 1 is an example of a multiple synchronous subsystem interconnected by an asynchronous network.

Related Invention No. 2 discloses a synchronization (sync) network interconnecting Monsoon processors for halting their operation substantially simultaneously in order to contain any erroneous data.

A purpose of the present invention is to provide debugging methodologies which provide repeatability in the state transitions. Obtaining repeatability in the state transitions for a multi-processor system is difficult because the difference in clock edges and the uncertainty in network propagation delay times prevent the same inputs from arriving in the same order to a state. If there were a way to allow the system to take little 'steps' which are alone repeatable state transitions, we could ensure the arrival and order of arrival of inputs to the same states.

Once we have the same inputs to the same states every time, then, by initializing the system with the same set of states, we can provide repeatability of state transitions every time. By having repeatability, if we have a malfunction we can use other methods of debugging to debug it.

After a system is designed and built, the user is faced with a difficult task of how to debug it. Debugging a system means to find all the defects which may be present that can cause the system not to function as planned.

If we were to restrict our attention just to synchronous systems and the interconnection of synchronous systems, a malfunction is expressed as an incorrect state transition in the normal path of state transitions.

Assuming we are examining a defect of the type mentioned above, how do we know if there is a defect on a particular system? One method is by analyzing the state transitions. A fault caused by the defect resulting in a malfunction will be expressed as an anomalous state transition which does not appear in normal state transitions.

For a synchronous system without any defects, as long as the initial states and inputs are the same, it will always traverse a set trajectory of state transitions. This trajectory of state transitions may be changed when a defect occurs because the defect might cause a fault which may induce the system to traverse into an error state. By analyzing all the state variables (i.e., all the bits that reside on storage elements) which compose every state, we can detect if a system is in an error state.

For a large system, examining every bit of state variable for each clock cycle becomes inefficient and cumbersome, so another method one could use is to provide some error detection circuitry for the fault to trigger. By using a parity error checker, for example, one could detect if a set of state variables were confined to an allowable subset. If we cannot detect the fault using these two methods, i.e., we do not have observability of the fault, then we assume that we cannot detect the defect.

Once we have discovered a malfunction, we would like to regenerate the transition into the error state many times, so we can isolate the fault by probing internal signals. To regenerate this error condition, we must have the system follow the same trajectory of state transitions as it did when the fault was first discovered. To do that, we need to have controllability in establishing the same initial states and the same inputs during every state change, so that the system will take the same steps as it did before.

If we can arrive at the error state every time, then we have determinism in repeating the fault condition. If, even though we have established the same initial states and inputs, the fault condition does not exist, then we have a transient defect which requires additional debugging effort. Once we have determinism in finding the fault, then various known debugging methods can be applied to this system to find the exact location of the fault. This process of setting the initial states and inputs, traversing through the same state trajectory to arrive at the error state every time, and analyzing the signals is known as deterministic debugging.

Repeatability in a Single Processor System

Let us consider the particular case of the system as being just a single synchronous processor element running a particular program. If we were to isolate this system from any external inputs, such as from any type of interprocessor networks, in order to deterministically debug the system while running this program, we would have to establish the same initial states before every run.

Establishing the initial states includes putting the code and data portion of the program into memory. Once we have done that, the program will execute a portion of the code for every clock transition. When a piece of code is executed, state variables will be changed, causing the system to traverse to a new state. Because code execution only occurs on a clock transition, we can consider the input which caused the state transitions as being the system clock. If we assume that the same code will be executed in the same order, then all we need to guarantee deterministic debugging is the establishment of the same initial states, since having identical inputs to each state is trivially guaranteed by the clock transition.

If, during the execution of the program, we have found a fault that is not transient, then to obtain the same state trajectory again only requires that we initialize the system to the same initial states and run until we are in the error state.

Repeatability in a Two Processor System

When we have a multi-processor system where all the processors, or processor elements (PE's), are connected via an asynchronous network, simply guaranteeing the same initial states may not guarantee repeatable state transitions. Even though all the PE's are individual synchronous units, the fact that each PE has its own clock and that all are connected by an asynchronous network will introduce two factors which affect the process of being able to traverse the same state trajectory every time. These two factors are the clock skew and the network delay among processors.

Let us analyze this situation in more detail by considering two processors with asynchronous clocks. If we consider the state of the overall 'system' as being the joinder of the states of each of the processors, then we, in general, would not be able to obtain the same state trajectories, because we now have two clocks that are input to determine the next 'system' state that also have a random relationship to each other. Because they have random clock skews, we would never be able to determine the order of state transitions, because one clock may arrive before the other or it may not. Thus it would be very hard to predict the 'system' state transition diagram if they were both asynchronous with respect to each other.

Would we be able to determine the 'system' state if they were both connected to the same clock? By having only one clock, it may appear that we have only one input to determine the next state. But in reality, we have to be concerned about the propagation delay of the network, as the data that is communicated from one processor to another becomes a second input to determine the next state.

Another method of visualizing the state transitions occurring in a two processor system is to assume that each processor has its own state transition diagram and will traverse to the next state when its local clock has a transition. Even though each processor has its own state transition diagram, the processors still affect each other by the data communicating on the network. Now instead of just having one input (i.e., the local clock) to determine the next state, each processor will also have an additional input from the other processor represented by the data on the network.

Thus, depending on the time of arrival and the relative skew between the two clock's edges, each processor may traverse to a different state every time. Now instead of a single trajectory represented by one processor with the same initial states and inputs, we have a whole tree of different trajectories depending on the arrival times of data from the network. Again, since the clock edge skew is random and the network delay is not a fixed number, we cannot have repeatability of a certain state transition trajectory. Thus in a two processor system with asynchronous clocks, we cannot repeat the path of state transitions every time if we run the system at normal speed.

If this is the case, then how does a system even function by having multiple clocks for multiple processing elements? The answer is that even though the hardware does not follow a deterministic path of state transitions, the software for dataflow machines like Monsoon synchronizes all the activities and outputs a result. Thus even though the state transitions taken by hardware are not repeatable, the results obtained from software can be made to be repeatable.

Repeatability in a Multi-Processor System

So far we have only been concerned with a two processor asynchronous system. What would happen if we add one, two, three, or more processors to this system? In the two processor system, we are concerned with the clock skew and the propagation delay of the network. In a three or more processor system, we also have to be concerned with the ordering of data that is arriving from the network.

FIG. 1 illustrates an example of a multi-processing system in which propagation delay in the data network affects the system state. Referring to FIG. 1, consider a three processor system where two processors are both sending data to a third processor. In this case, PE #3 will traverse to a different state if it receives datum A from PE #2 first than if it receives datum B from PE #1. In order for us to guarantee PE #3's path of state transitions, we have to have a fixed order of data inputs, i.e., we have to guarantee that either PE #3 receives the datum first from PE #1 every time or it receives the datum first from PE #2.

Since the arrival of data from each of the processors depends on the propagation delay of the network and the relative times in which data is being injected into the network, we cannot guarantee ordering because those two factors have a range of uncertainty. Even if we have all three processors and the network share the same clock, there would still be a race condition to see if datum A or B would arrive first, because both processors may inject data into the network at the same time.

Once we know that the hardware does not follow a set path of state transitions, how can one deterministically debug a multi-processor system? One known method is simply to have non-repeatable state trajectories every time. In the case of two asynchronous processors, we would just let the system run at normal clock speeds until a malfunction is detected by specially dedicated error checking circuitry. Once detected, since the system is running at normal speed, we have to halt the entire system quickly enough such that the erroneous data caused by the fault would not be propagated to other processors to be executed. This is otherwise known as containing the contamination caused by the fault.

Related Invention No. 2 discloses a mechanism for halting all the processors in a short amount of time, in that a special network can broadcast a 'halt' message simultaneously to all the processors. By halting the system fast enough, it is possible to locate the source of defect just by capturing the state variables and inputs of the error state. If we cannot locate the source of defect, then we have to start over from the initial state and hope that the system will traverse the same path of state transitions.

As alluded to above, the only method by which we can guarantee ordering of state transitions is by selectively single-stepping one or more processors. By selectively single-stepping, we can enable or disable the outputs of the processors such that only one can send data into the network. By only allowing one source of data on the network, we eliminate the ordering of data problem because there are no other processors competing to send the data to the same processor. We also delay the time between steps so that we guarantee the arrival time of data.

One method of single-stepping two processors is by allowing each processor to execute only one clock cycle worth of instructions and then stopping it. By only allowing each processor to execute a single-step at a time, we can delay the next step until after the network has finished sending its data. This removes the uncertainty factor in the delay of the network.

We do not need to have both processors share the same clock, because it is not important when each of the processors traverses to the next state. The important factors are that each processor only execute one clock cycle and that it receives the input from the network before it traverse to the next state. We can guarantee that the processor will receive the input from the network, because we can set the delay between singlesteps to be greater than the delay of the network. Thus, by initializing to the same initial states and delaying the single steps, we can guarantee that the system, as a whole, will always traverse the same path of state transitions every time.

In summary, the known methods of single-stepping require either that we step one processor at a time and wait for the network to clear or step all the processors and then wait for the network to clear. These are slow methods, because we cannot let the system run at its normal speed.

BRIEF SUMMARY OF INVENTION

The present invention discloses a faster method of single-stepping multiple times by having one or more processors execute many clock cycles at normal speed before halting to communicate with each other. Since each processor's running at normal speed with no network interaction will always traverse the same path of state transitions, this method preserves the state trajectories without the slow speed of multiple single-steps.

According to one aspect of the present invention, there is provided in a data processing system comprising a plurality of processing elements coupled to a network, a method for single-stepping the operation of the processing elements, wherein the method comprises the steps of (a) disabling the operation of each processing element except one; (b) allowing the one processing element to execute N number of steps while its output is coupled to the network; (c) halting the operation of the one processing element; (d) allowing sufficient time for the one processing element's output to finish propagating through the network; and (e) repeating steps (a) through (d) until each processing element has operated.

According to another aspect of the present invention, there is provided in a data processing system comprising a plurality of processing elements coupled to a network, a method for single-stepping the operation of the processing elements, wherein the method comprises the steps of (a) disconnecting the output of each processing element from the network; (b) allowing all processing elements to execute N number of steps; (c) halting the operation of all processing elements; (d) coupling the output of one of the processing elements to the network, allowing sufficient time for such processing element's output to finish propagating through the network; and (e) repeating step (d) until each processing element has coupled its output to the network.

BRIEF DESCRIPTION OF THE DRAWINGS

The invention is pointed out with particularity in the appended claims. However, other features of the intention will become more apparent and the invention will be best understood by referring to the following detailed description in conjunction with the accompanying drawings in which:

FIG. 12 shows a representation of the loading control register (LCR).

FIG. 13 shows a representation of the SCAN register.

FIG. 14 shows a representation of the Control register (CR).

FIG. 15 shows a representation of the Shadow Control register (SCR).

FIG. 16 shows a representation of the STEP register.

FIG. 17 shows a representation of the Halt Enable register (HEN)

FIG. 18 shows a representation of the Halt Status register (HST).

FIG. 19 shows a representation of the Status register (SR).

FIG. 20 shows a representation of the SYNC register.

FIG. 21 shows a representation of the STOP register in the PARC register.

DETAILED DESCRIPTION OF A PREFERRED EMBODIMENT

Overview of Monsoon Multi-Processing System

As mentioned above, the multiprocessor Monsoon system provides an example of multiple synchronous processors connected by an asynchronous network. Monsoon is a parallel processor machine based on the Tagged Token Dataflow Architecture. It is a dataflow machine implemented based on an explicit token storage (ETS) scheme and is especially suited for data-scheduled numeric and symbolic computation.

A typical Monsoon system comprises processing elements (PE), I-structure (IS) memory units, and network switches. The PE's and IS's are connected via a 200 MHz token network and network switch units. Although each unit is a synchronous subsystem, the system as a whole is asynchronous because every PE, IS, and switch unit contains a local clock.

Greater detail information is provided below concerning the architecture of the PE and, in particular, the interface between the network and the eight-stage processing pipeline. The implementation of the asynchronous network, the associated switch unit, and the routing of data from one processor to another will also be discussed.

Tokens

Unlike a von Neumann computer, which executes instructions that are sequentially ordered, the instructions for a PE are only partially ordered. A PE will only execute an instruction if the datum for that instruction is available. The datum, context, and the instruction for a PE are encoded in a state descriptor called a token.

Once a token is inputted in a PE, an eight-stage pipeline decodes the token into instructions and data and performs the necessary arithmetic computation to form one or more resultant tokens. The resultant token may then serve as the input to another PE or to itself.

Because tokens are the only source of communication among PE's, tokens are the only source of input that may change the state transition of a processor (besides, of course, its local clock). Thus the state of a PE depends on the order and type of tokens received. This is very helpful for debugging because just by analyzing the flow of tokens, we can understand the state transitions of any particular PE.

Figure 1:
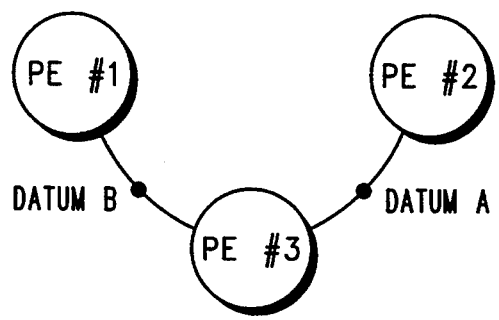
FIG. 1 illustrates an example of a multi-processing system in which propagation delay in the data network affects the system state.
Figure 2:
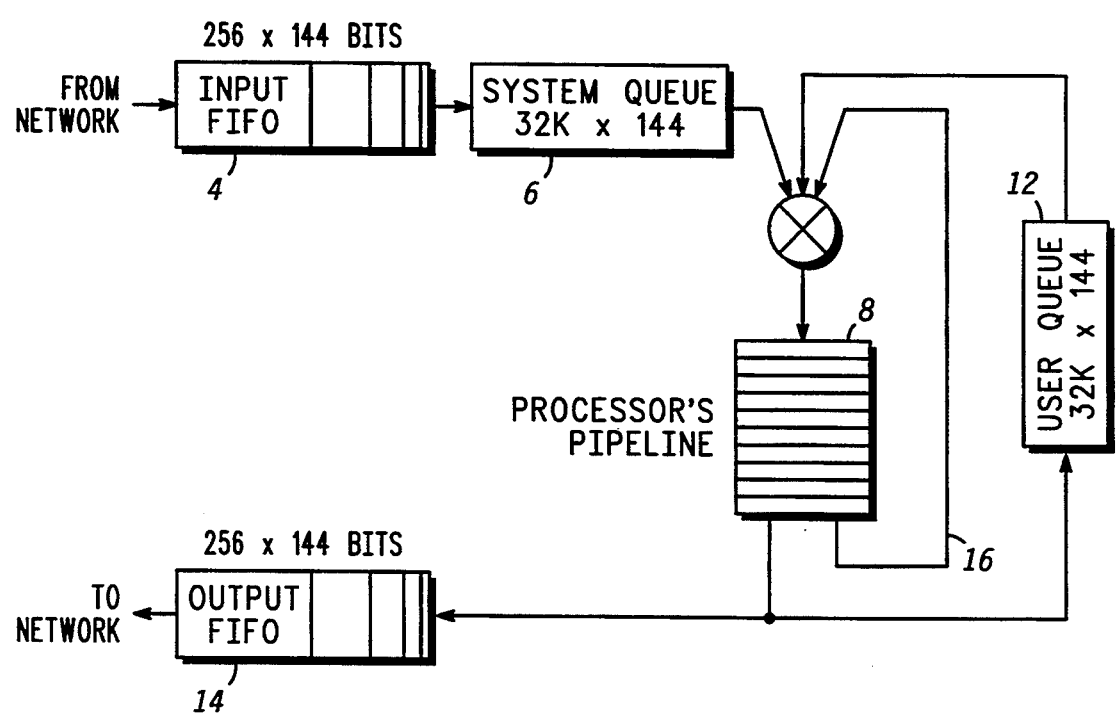
FIG. 2 illustrates schematically several paths that a token may take within a multi-processing system in accordance with the invention.

FIG. 2 illustrates schematically several paths that a token may take within a multi-processing system. When a token is formed at the last stage 8 of the PE's pipeline 10, it can follow any of three different paths. The token may be recirculated to the top of the pipeline for further processing, stored in a 32 k×144 bit user token queue for later processing, or sent to the token network via a 256×144 bit output FIFO 14.

FIG. 2 also shows that the input token may come from one of three different sources; the recirculated loop 16 from the end of the pipeline, the user queue 12, or the 32 k×144 system token queue 6. The system token queue 6 acts as a temporary storage for the tokens coming from the token network, as it is fed by the 256×144 bit input FIFO 4 which is connect to the network. Although it is shown that the output of the input FIFO 4 is connected directly to the input of the system queue 6, in reality there is a token queue bus which connects the user queue 12, system queue 6, input FIFO 4, output FIFO 14, and the output of the pipeline 8 together.

Figure 3:
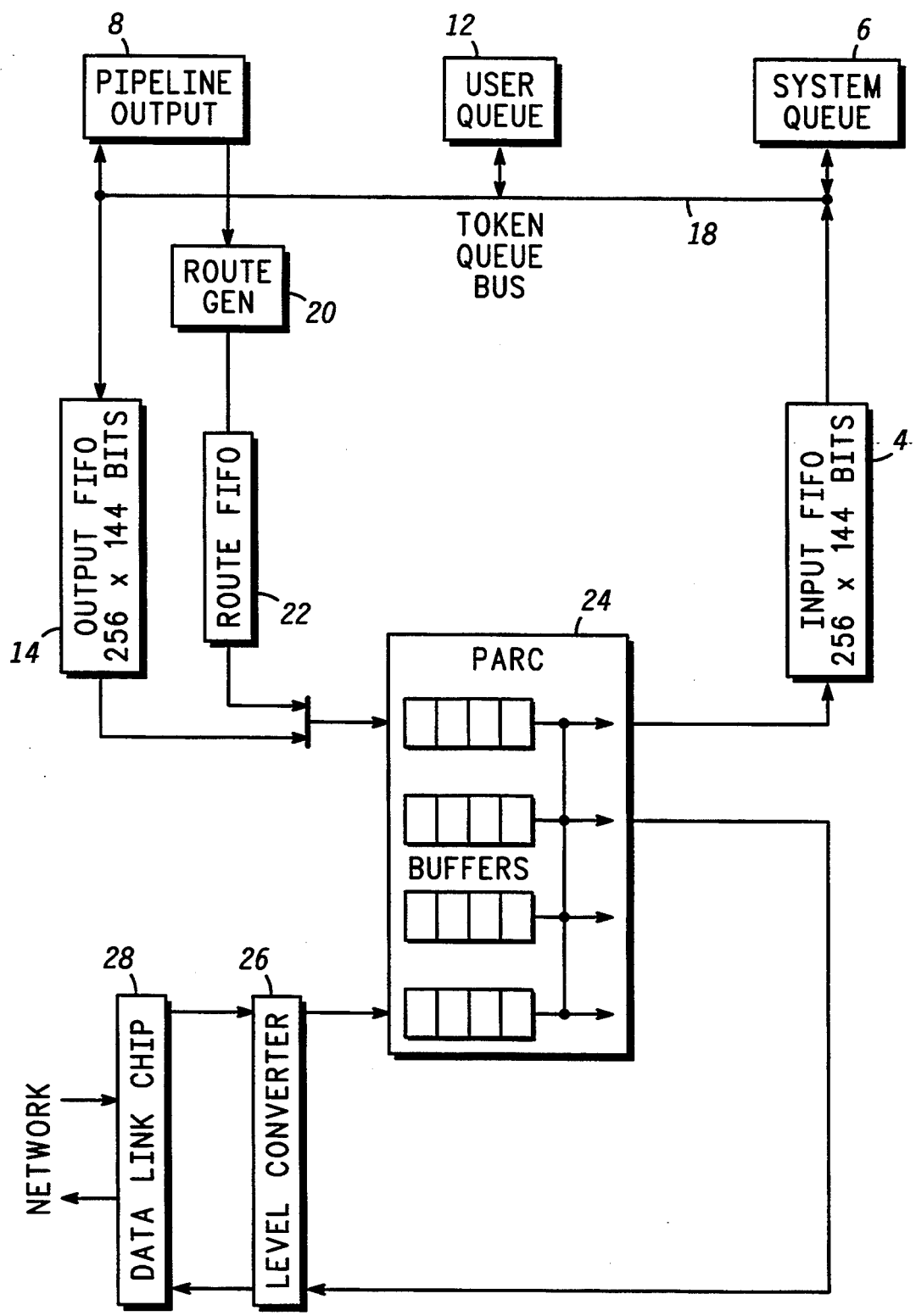
FIG. 3 shows a block diagram of the PE network interface in accordance with the invention.

FIG. 3 shows a block diagram of the PE network interface. FIG. 3 indicates that if the pipeline is outputting a token to either the user queue 12 or the output FIFO 14, there cannot be any data traveling from the input FIFO 4 to the system queue 6. Typically when the token queue bus 18 is not being utilized by the pipeline (e.g., sometimes a token may not form any resultant tokens), a transfer of tokens is made from the input FIFO 4 to the system queue 6 to prevent the input FIFO 4 from overflowing. Once the tokens are in the system queue 6, they wait there until accessed by the eight-stage pipeline.

One aspect of the system queue 6 is that it is possible to configure it such that it appears to be empty to the pipeline, so that no tokens would be removed from the system queue 6. But because it is really not empty, transfer of tokens from the input FIFO 4 would still occur if the token queue bus 18 is not being used. This feature may be used for detailed debugging of the PE.

When a token destined for another PE is placed in the output FIFO 14, a separate route generator 20 generates the proper information necessary for the token to travel through the token network and into the receiving PE. This information is placed in a separate route FIFO 22. The combination of routing information and the actual token itself is called a packet.

These two FIFO's are needed to act as a buffer between the processing logic running at 10 MHz and the network interface logic running at 200 MHz. Although the source of the 200 MHz is used to generate the 10 MHz clock of the processing logic, we can consider this section to be asynchronous to the rest of the PE, because events can occur at any edge of the 200 MHz clock which will appear asynchronous to the logic running at 10 MHz.

In particular, a four-input four-output Packet Routing Chip (PARC) 24, running at 50 MHz, is responsible for accepting packets from any of its four inputs and directing them to any of its four outputs based on the routing information in the packet. On the PE, only two inputs and two outputs are used. One of the inputs is used for taking the packets off the two FIFO's, and the other input is used for accepting packets arrived from the network. Of the two outputs used on the PARC 24, one is connected to the input FIFO 4 and the other is connected to the input of an ECL transmitter portion 26 of a Datalink chip 28.

The Datalink chip 28 contains essentially a transmitter/receiver pair. The transmitter portion of the Datalink located on the sender's unit, generates a clock signal along with the packet which the receiver portion of the Datalink located on the designated PE/IS unit uses to capture the incoming packet. When a PE unit is running, the packets coming from the output FIFO's are always directed by the PARC to go to the network. All the packets received from the network will only be directed to the input FIFO 4. If a token arrives at one of the input ports on the PARC 24 destined for an output port which is in the process of sending another token, then the packet sits on one of the four internal buffers pertaining to that input until that port is cleared. If all four internal buffers pertaining to an input are full, then no packets will be accepted from that input until there is one free buffer space.

During debugging, a user has the option of stopping any output of the PARC 24 from transmitting packets.

This is useful in single-stepping because we can limit certain processors from using the network. Although one or more of the outputs are stopped, the ones that are not can still transmit packets. The inputs will also be able to accept packets.

Figure 4:
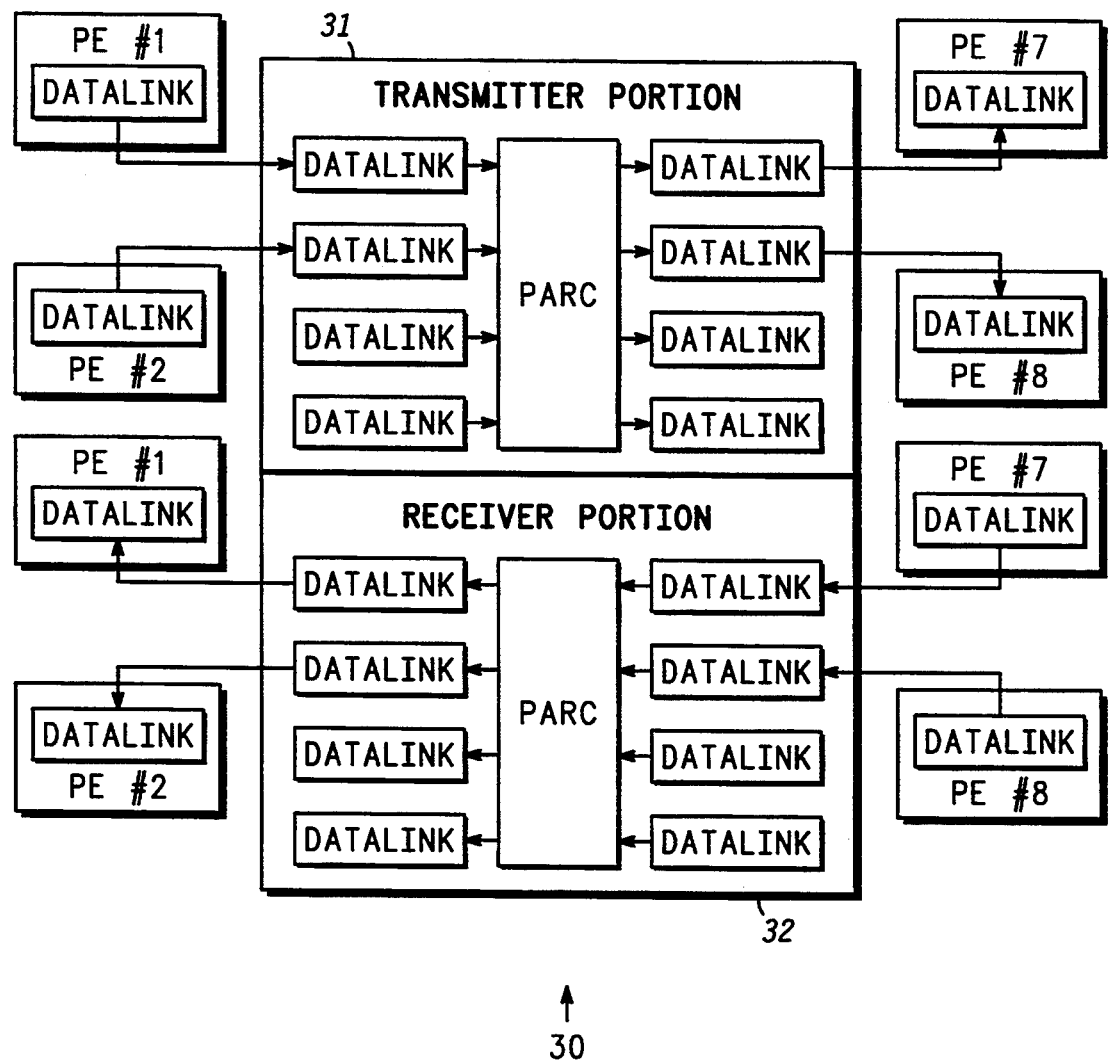
FIG. 4 shows a block diagram of a switch unit used to connect more than two PE's in accordance with the invention.

FIG. 4 shows a block diagram of a switch unit 30 used to connect more than two PE's. For a system with greater than two processors, a switch unit, such as switch unit 30, is needed to communicate among the processors. The switch unit 30 has its own clock and essentially contains a transmitter section 31 and a receiver section 32. In each section, we have one PARC with four Datalinks located on each of its inputs and outputs.

By providing this configuration, we essentially have a direct path from any one PE to another. During normal operations, however, more than one packet may be received by the PARC on the switch unit that is destined to the same PE/IS. In this case, the packet that arrives first will be the first to be received by the designated PE/IS. This, as we shall see later, will cause a problem in ordering of the tokens as the speed of the packet depends on the propagation delay of the network, which is not a precise number.

Figure 5:
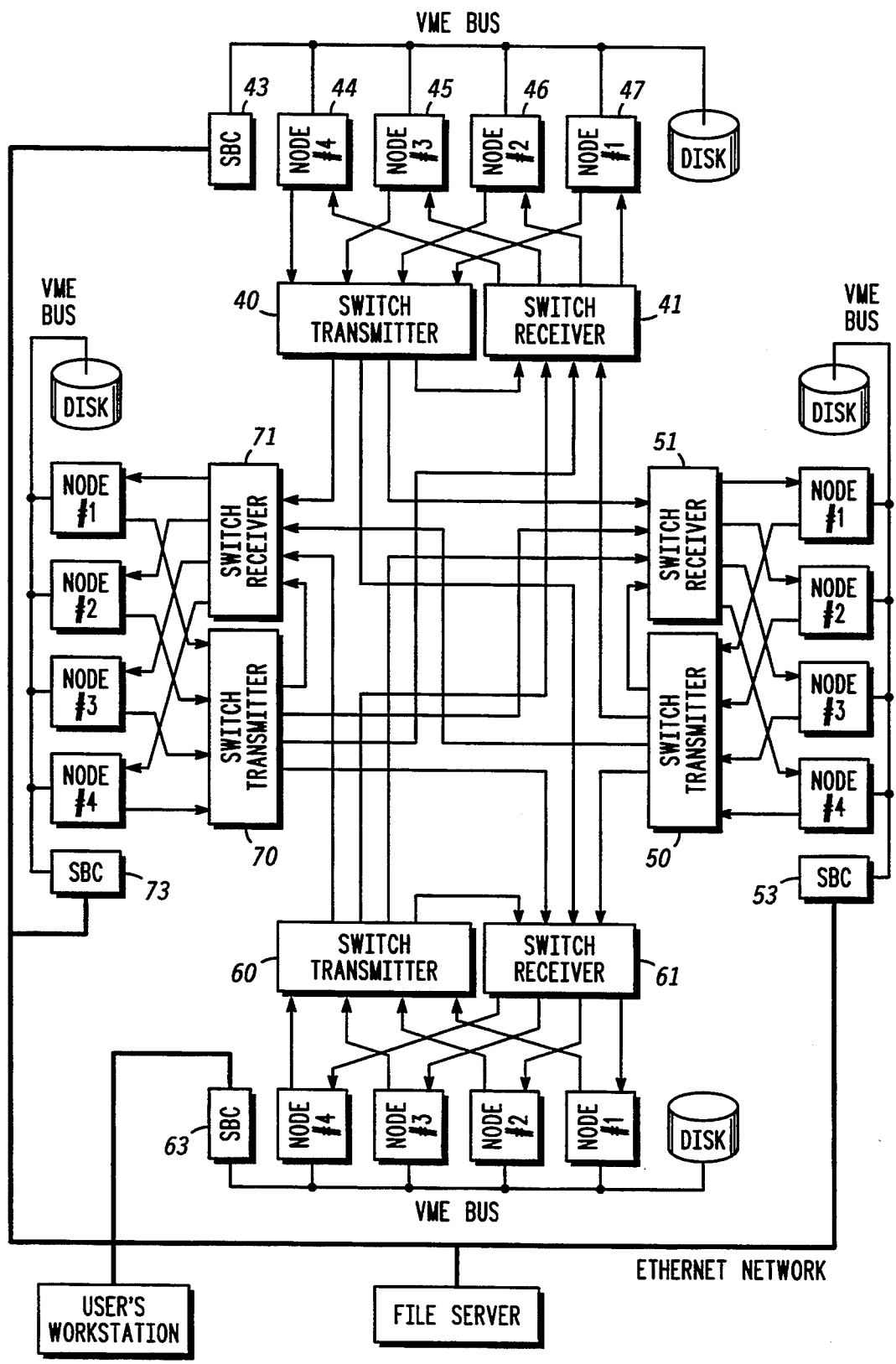
FIG. 5 shows a block diagram of a 16 processor configuration ,in accordance with the invention

FIG. 5 shows a block diagram of a 16-processor configuration. Each group of four PE's, such as PE's 44–47, is coupled both to a switch transmitter unit, such as unit 40, and to a switch receiver unit, such as unit 41.

In addition to the PE, IS, and switch units, a typical Monsoon system also incorporates a single-board computer (SBC) unit. The SBC unit is mainly used for handling input/output accesses from the PE to external devices (e.g., memory stores such as disk drives.) It also has Ethernet connections which allow a user to communicate to the PE's.

In the 16-processor configuration shown in FIG. 5, each group of four PE's, such as PE's 44–47, includes a SBC, such as SBC 43.

Debugging Tools

Beside the hardware which implements the functionality of the Monsoon system, there are also debugging 'tool' which aid in the process of debugging it. Various hardware registers, discussed below, are provided, and to control these hardware debugging tools, a software program called the hardware debugger is used.

Figure 6:
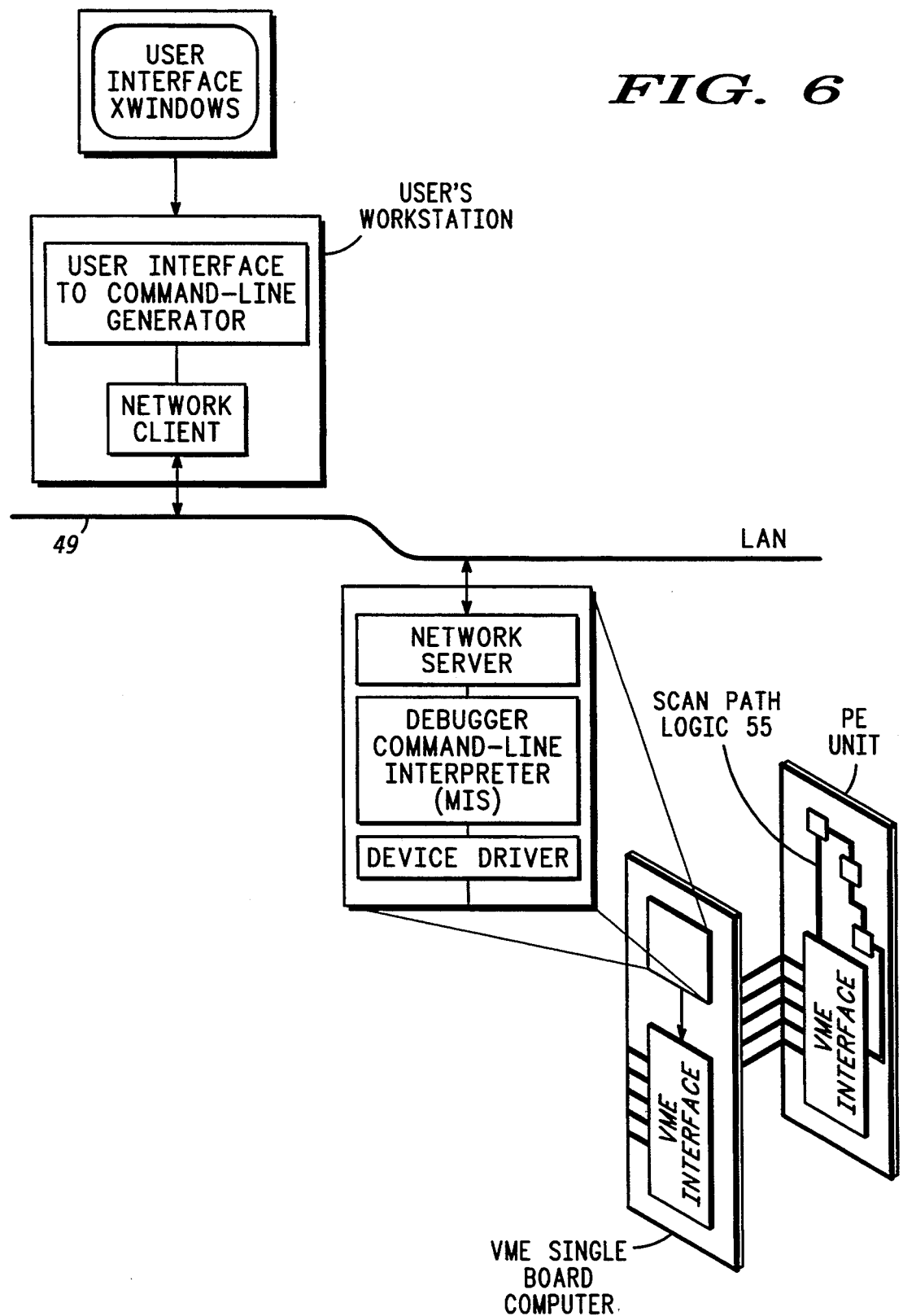
FIG. 6 shows a block diagram of the software architecture of the hardware debugger in accordance with the invention.

FIG. 6 shows a block diagram of the software architecture of the hardware debugger. During the process of debugging, the user interacts with the hardware debugger which resides on the user's workstation. This debugging tool communicates to each of the SBC units the commands typed by the user. Some of these commands may be "halt all processors", "step processor #2 one time", "examine memory location xxx to yyy", etc, This communication occurs via the Ethernet network 49. The SBC unit interprets these commands to suitable device driver calls which access the VME control logic and the VME bus.

Each of the nodes that resides on the VME bus also has a VME controller which has control of the various debugging tools that reside on each node (e.g. Scan Registers, Breakpoint Registers, HEN/SEN Registers, and Synchronization network. See "VME Interface Registers" below for further details.)

One of the debugging tools which is implemented on each of the nodes is Scan Path Logic 55. Scan Path Logic requires that special scannable registers be used on the unit. These scannable registers enable one to view the bits which reside on storage elements such as flip-flops, registers, and memory elements.

In a synchronous system, viewing these bits which reside on storage elements is equivalent to viewing the state variables that describe that state. Using scan path registers also enables us to change the state variables thus changing the state of the system. This is useful for initializing the system to a certain state. Finally by using scan path registers, we can halt the entire system just by de-asserting the clock enable line of the registers. This has the same effect as disconnecting the clock from the entire unit. Since all the units are synchronous, without a clock signal, the states cannot change. Being able to halt a system without changing states is crucial in debugging.

Figure 7:
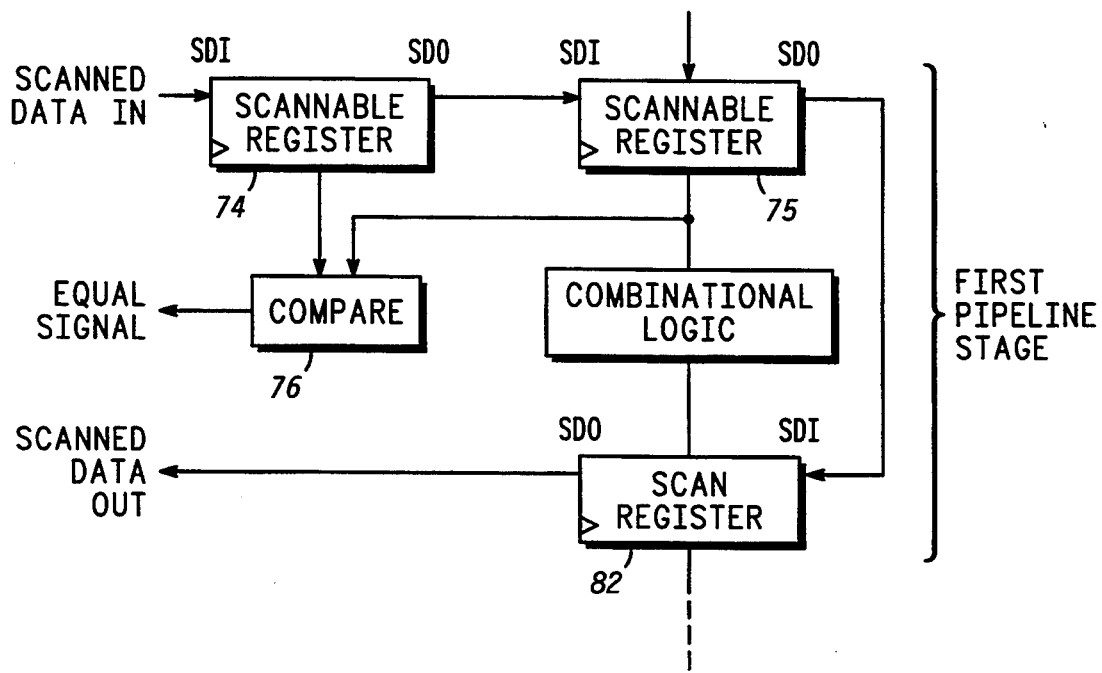
FIG. 7 shows a block diagram of registers using in debugging a ,multi-processing system in accordance with the invention.

FIG. 7 shows a block diagram of registers used in debugging a multi-processing system. Part of the set of debugging tools which are implemented in hardware are breakpoint registers and error detection tools. Breakpoint registers are scannable registers which the user can program to detect whether certain conditions exist on certain signals.

For instance, during the course of debugging, we might like to know if and when a particular token will be executed by processor #5. We can think of this token as being an "error" token caused by some malfunction in the system. To detect this token, a scannable register 74 is provided which has the same number of bits as the register 75 at the top of the pipeline.

FIG. 7 shows the breakpoint register 75 and scannable register 74. The outputs of the two registers are connected to a comparator 76. By scanning in the value of the "error" token into this additional register 74, when PE #5 receives this token, the two outputs would match and the comparator 76 would assert an 'equal' signal. If we just monitor the output of the comparator 76, we would know when this token arrives at the beginning of the pipeline and take appropriate action (e.g., halting the system).

If we want to add more features to this breakpoint register, we can also couple a Scan register 82 to the comparator 76 to detect for conditions such as: "is current token > the scanned token?", "only match bits 24 to 36 of the scanned token", etc. These features are actually similar to the breakpoint register established at the beginning of the Monsoon pipeline.

Besides testing for user-programmable conditions on certain signals, there is other hardware provided to detect erroneous conditions. For instance, parity is implemented on all the memory modules so parity errors can be detected by using parity checkers.

Sometimes when a malfunction has occurred, such as parity error, it is best to halt the entire Monsoon so that the erroneous data is not processed, thereby contaminating valid data in other areas.

Figure 8:
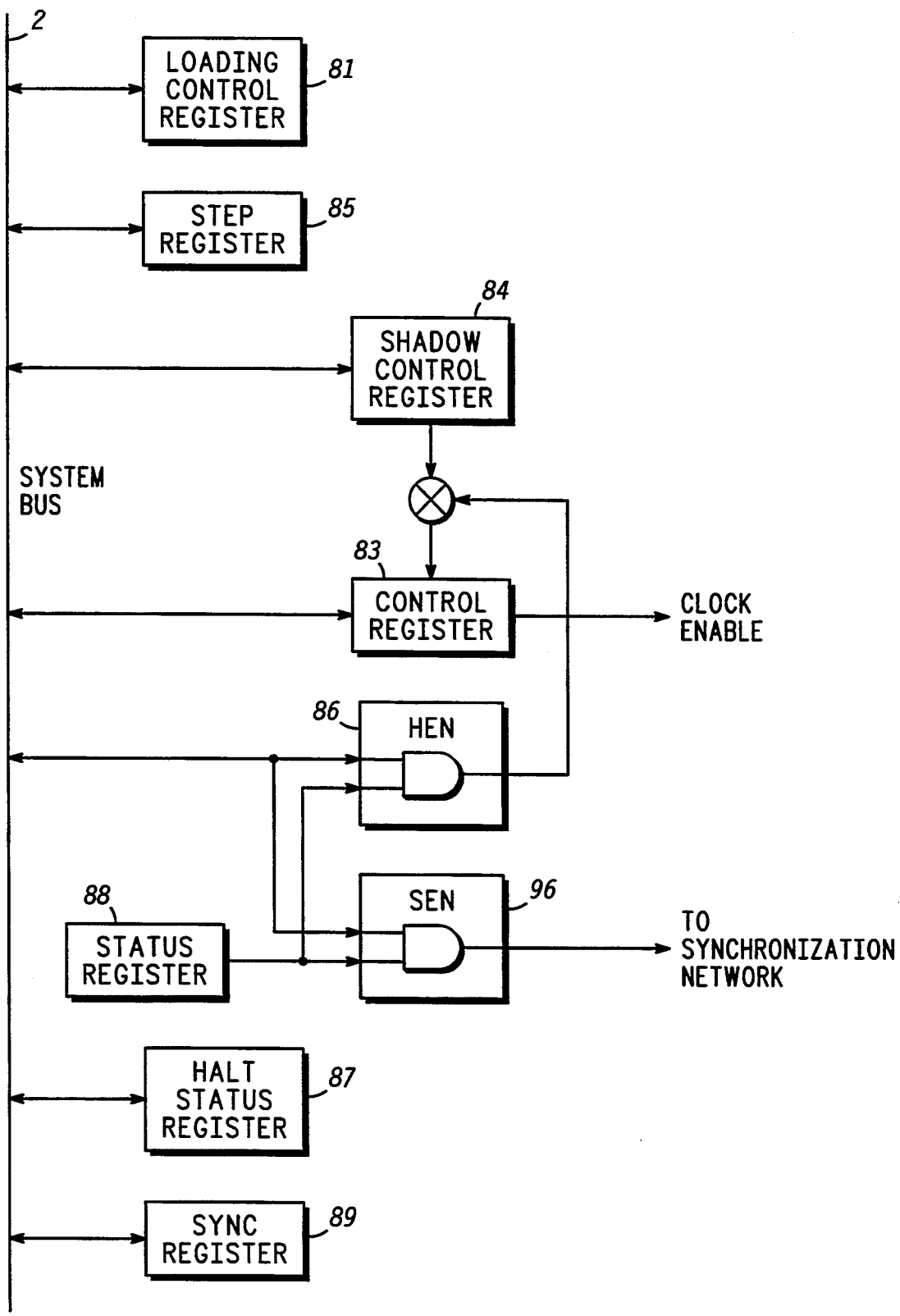
FIG. 8 shows a block diagram of registers used to detect errors and for halting the operation of a multi-processing system in accordance with the invention.

FIG. 8 shows a block diagram of registers used to detect errors and for halting the operation of a multi-processing system such as the Monsoon system. These registers comprise Loading Control register 81, Control register 83, Shadow Control register 84, STEP register 85, Halt Enable register 86, Halt Status register 87, Status register 88, SYNC register 89, and Sync Enable register 96.

Although sometimes it may be necessary to halt a processor, it may not be necessary to halt the entire system. To halt a single processor, a bit in the Control register 83 can be set which will disable the clock enables of all the scan registers of a PE in less than one clock cycle. This bit can be set by the user's writing a '1' to it from the VME bus or by the Shadow Control register 84 when it gets copied into the Control register 83 (as shown in FIG. 8.)

The Shadow Control register 84 register has the same bit definition as the Control register 83 and can also be accessed from the VME bus. To halt the processor by copying into the Control register 83 requires that the same bit be set in the Shadow Control register 84. The content of the Shadow Control register 84 only replaces the content of the Control register 83 when a halt condition arises.

Halt conditions can be established by the user by writing into the Halt Enable register (HEN). Each bit in this register, described in detail below, represents a condition which has been implemented in hardware to detect. For example, we may enable the parity error condition bit which will activate this copy process whenever a parity checker detects that there is a parity error. If we do not have the parity error condition bit enabled, then even if there is a parity error, we would not be able to detect it.

One condition which is very useful during debugging is when the STEP register 85 equals zero. The STEP register 85 is a register accessible from the VME bus 2 which gets decremented for every clock cycle that the PE is executing a token. Thus a user can write a number '5' in this register, set the appropriate bits in the HEN register 86, and have the PE halt whenever it has finish executing 5 clock steps.

This HEN register 86 only defines conditions which will halt the local processor. What happens if we want a parity error on a PE to halt the entire system? In this case, a separate Sync Enable register (SEN) 96 with the same bit definition as the HEN register 86 is used. By enabling the parity error condition bit in this register, for example, whenever a parity error is detected, a 'halt' message will be broadcast to all the other PE's telling them to copy their Shadow Control register 84 into the Control register 83. Notice that a copy is made to the Control register 83 rather than writing directly to the Control register 83 (as shown in FIG. 8.) This is to provide added flexibility to selectively halt certain processors and not others. This message is broadcast to all the other PE's using the synchronization network.

As previously described, the Monsoon system comprises PE, IS, and switch units. Each of these subsystems has its own individual clock. The subsystems communicate with each other by passing tokens which contain instructions, data, and other information needed to process that token.

Thus the source of inputs for a PE or IS is encapsulated into the token itself. This makes debugging the Monsoon system simpler, because we can just analyze the flow of tokens among the processors. To pass tokens from one PE to another requires interactions with the 200 MHz ECL token network and the switch unit 30. The PE interfaces with this fast asynchronous network via the previously described plurality of input buffers 4 and output buffers 14.

A PARC 24 on every switch unit determines the ordering of tokens by the order of arrivals from each of the PE's. This represents a problem as we try to obtain repeatable state transitions, because arrival times of tokens depend on the network propagation delay, which is not a fixed number.

The scan path registers, accessible via the VME bus, enable one to view the state variables, initialize the PE to a certain state, and halt the entire PE without changing any state variables. The breakpoint registers enable one to detect for certain conditions on a set of signals. The Halt Enable registers give one the capability to de-assert the clock enables and halt a PE whenever a breakpoint or error has been detected.

With the sync enable register and the Shadow Control register 84, a user has the capability to selectively halt one or more PE's. Each PE can also halt itself and others when it has detected an error condition. This is very useful in the prevention of the spread of contaminated data. To halt other processors is the function of the synchronization network.

Multiprocessor Synchronization Network

If the system is running at normal speed (not single-stepping) and a fault occurs that potentially generates some erroneous token into the network, we need to be able to broadcast a 'halt' message to all the PE's, such that they will all stop before that token has a chance of being processed. Clearly the halt message must be propagated faster than the speed at which tokens can travel through the network.

The speed at which tokens can travel through the network depends on, among other factors, the size of the system (i.e., the number of processors in the system). The smaller the size, the less the propagation delay. The synchronization network can be thought of as being a single wire connecting all the processors.

The meaning of the signal pulse on the synchronization network depends on the bits set in the Shadow Control register 84. This is because when the pulse arrives from the synchronization network, a copy is made from the Shadow Control register 84 into the Control register 83. (This is the same as when a enabled condition, set in the HEN register 86, occurs.)

For example, to halt all the processors, the halt bit in the Shadow Control register 84 must be set, so that when the copy occurs, the PE will halt.

Similarly to start all the processors requires that the halt bit not be set in the Shadow Control register 84. To single-step all the processors, a single-step bit in the Shadow Control register 84 is set which allows the PE to only execute one clock cycle for every pulse on the network.

To generate a pulse on this network, the SEN register 96 is used to specify the specific error conditions similar to the HEN register 86. The user can also generate a pulse on the network without any SEN-enabled condition by writing to the SYNC register 89 accessible via the VME bus.

Besides being used for debugging purposes, the synchronization network is also used for starting and halting all the nodes during normal operations. Upon power-up, the Monsoon is in a halted state. After the initial loading of the microcode and the user program, it is necessary to start all the nodes to begin computation. To do this a pulse is asserted on the synchronization network to start the system.

While the system is running, one may desire to collect statistics about the behavior of the machine. Information such as the amount of tokens allocated to any PE at any time is useful for determining the effective usage of the machine. To obtain this information, all the nodes must be halted so that a snap-shot can be taken of the instantaneous number of tokens per PE by scanning out all the states. Another reason for taking a snap-shot of the state of the system is for performing checkpoints.

Checkpoints are backups of the states of the machine so that if the system crashes, one has a point in time to return to. Checkpoints are useful in the initial stages of operation when the Mean Time Between Failure (MTBF) may be low.

On the switch unit (e.g. switch transmitter 40, FIG. 5), one output from the transmitter section loops back to the input of the receiver section (e.g. switch receiver 41). This is so that if all the nodes are to halt at about the same time, we can program the PE/IS's such that the one which caused the sync does not listen to its local signal but rather to the signal which is recirculated through the network. (To program this we set the SEN register 96 and not the HEN register 86.) Thus any PE/IS which pulses the sync line receives it only after it has been delayed by the network (as other PE/IS's in the system.)

Debugging a Monsoon Multiprocessor System.

For the simple case of a one or two PE system, so long as some criterion is met, we do not have to perform single-stepping as there other quicker and better methods of assuring repeatable state transitions. But for a system comprising three or more processors, uncertainty factors are introduced when we connect processors and switch units together. Because of these uncertainties, we would have to single-step in order to have repeatability. Let us start by analyzing a system with only one PE subsystem.

Debugging a Single PE System.

In a system with only a single PE subsystem, we can safely assume that we have no network interaction. The network, as mentioned before, is asynchronous from the processor itself in that it operates on its own clock. By not including the network, the only inputs we have to cause a state transition is the clock changing from low to high. Thus we can simplify the situation down to debugging a synchronous system.

To deterministically debug a single PE system, we know that we must have repeatability of the state transitions. To obtain the same state transition for an isolated synchronous system requires us to be able to accurately establish the initial states. By using the scan path logic, we can easily initialize the PE to some initial state.

This is done by accessing the Scan register 82 from the VME bus and writing, one byte at a time, the initial states. Since the PE is pipelined and every stage register is scannable, we are able to give the same initial inputs by scanning in a token at the top of the pipeline. Once we have the same initial states, we can guarantee that the PE will follow a repeatable path of state transitions even running at normal speed because we have the same inputs at every state transition (i.e., the local clock).

Once we have the PE traversing the same path of state transitions, we can detect a fault caused by a defect because we assume that it will result in a malfunction which will be expressed as an anomalous state transition into an error state.

To detect the transition into this error state, we can examine the state variables by scanning out the bits within the registers after every clock cycle. We can also use the error detection tools discussed previously if we want to detect the fault at normal speed.

For instance, if the fault causes a parity error, then we can enable the parity condition bit in the HEN register 86 such that the PE will halt before the next clock transition. It is important, for two reasons, that the logic which de-asserts the clock enable lines to all the registers be able to halt the PE before the next clock cycle.

First, since the PE is register-pipelined, by halting the PE before the clock has a chance to make a transition means that we can scan out the registers and examine the cause of the fault. Second, by halting before the next clock edge, we can prevent the erroneous data from being spread to the next pipeline section. Once we can guarantee that, to have the same initial states is all we need to have repeatability in state transitions.

Debugging a Two PE System

Figure 9:
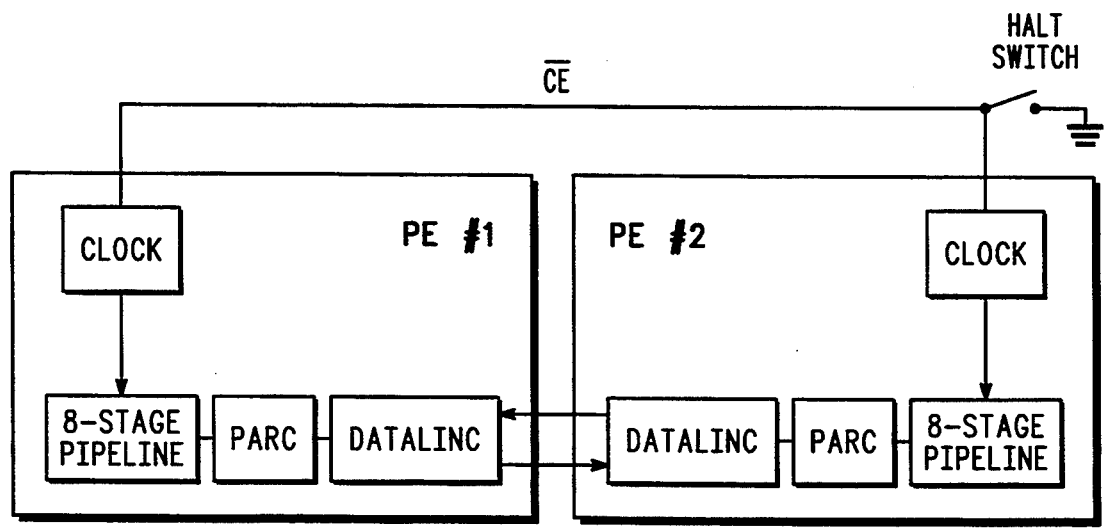
FIG. 9 shows a block diagram of a two-PE multi-processing system with asynchronous clocks.

FIG. 9 shows a block diagram of a two-PE multiprocessing system with asynchronous clocks. What happens when we connect a second PE, with its own clock, to the first one and use the asynchronous 200 MHz token network?

Now besides the one clock providing the only input to this system, we have added another clock transition and the interprocessor communication of tokens as inputs which will affect the state transitions.

This situation is similar to the discussion appearing in the "Background" section regarding two processor with asynchronous clocks. As we recall, the main concern was the uncertainty in the clock skew and the range of propagation delay of the token network. Because of these two factors, we could never accomplish repeatability in the state transitions if we are running at normal speed using two different clocks.

By having both processors share one clock, we can remove the uncertainty associated with having two clocks, but we still have the concern regarding the range of propagation time for the inter-processor communication network.

The criterion for having repeatable state transitions is if we can guarantee that the token will arrive at the other PE's input FIFO before the common system clock has a transition. In the case of a two-PE system, the range of propagation delay has to be calculated from the time when the token is placed in the output FIFO to the time the token leaves the input FIFO of the receiver's PE. This is calculated to less than one clock cycle.

Thus we could guarantee that if a token is sent from a first PE to a second PE, the token will always arrive as an input to the second PE before the clock transition. Because we can guarantee the same inputs in every state, all we need is to guarantee the same initial states and we will have repeatability in the path of state transitions even if we let the system run at full speed.

One method by which we can have repeatability in state transitions is to single-step the system. To single-step two processors, one method is to allow each PE to execute only one clock cycle based on its local clock. After each PE has executed one clock cycle, they halt until we again allow them to execute another cycle. By halting the system between clock cycles, we allow the network to finish propagating any tokens it may have, so that on the next clock cycle of whichever PE, it will have received the token. This method of letting both PE's run for one clock cycle only work for the two-PE system, because no switch unit is used. The reason why a switch unit affects this is explained in the next section.

Debugging More Than Two PE's

With more than two PE's, we need to have a switch unit to interconnect all of them. As described above, the switch unit contains two sections, each containing a PARC and four Datalink chips at each of its input/outputs. In a typical 16-node system, four switch units are provided.

In this system, for a PE to transfer a token to another, the token must travel through four PARC's and six Datalink chips. This increases the overall range of propagation delay of the network to greater than one clock cycle. From our discussion in the previous section, we see that if the range of propagation delay is greater than one clock cycle we cannot obtain repeatable state transitions even if we have all the PE's share one clock source.

By introducing the switch unit, we have also introduced another factor of uncertainty. The PARC chip directs the packets received from its four inputs to any of its four outputs depending on the routing information. During the operation of the system, two PE's may send two different packets that are destined for the same PE. In this case, the PARC is faced with a dilemma, because there is only one port connected to the receiver PE and two packets are competing to use it.

The solution that is implemented on the PARC is that as soon as a packet is received, a scheduler arranges a time when the packet can use the output port. This implies that whichever packet arrives first will be the first to use the output port. The arrival of packets depends on when the PE sends it and the exact propagation delay of the network.

Because two processors will have different clock skews, the time when each PE sends the token will never be the same. Even if we have both processors running on the same clock, the propagation delay of the network is never a fixed number. Thus the ordering of tokens at the input FIFO of a PE may not be the same every time. If the ordering of tokens is not the same, then the PE will definitely traverse different state trajectories, and we cannot guarantee that the PE will receive the same inputs at each state transition.

We have seen that having all the processors share the same clock will not guarantee repeatability of state transitions because the range of delay for the 'network is greater than one clock cycle. Moreover, we would still have the ordering problem even if the network were synchronous to the rest of the system.

Methods of Single-Stepping

We will now describe two methods by which we can single-step a sixteen-PE Monsoon system. The first method steps only one processor at a time while the others are in a halted state. The second method enables all the processors to take one step by disabling the output to the network. The output of each processor is then enabled one at a time.

To have repeatable state transitions, we cannot have two or more nodes send packets to the network at the same time. This constraint is due to the possibility that both of the packets are destined to arrive at the same node. In this case, a non-deterministic event may occur in the packet router (PARC) on the switch unit when both packets arrive close in time. So the PARC makes an arbitrary decision which will mean that the output ordering for the two tokens will not necessarily be in the same order every time. If we have one PE that is the source of all the tokens, then we would not get this ordering of token uncertainty.

Another observation is that since the network has a range for its propagation delay, when a first processor sends out a token to a second processor, the clock edge in which the second processor sees the token is indeterministic. Thus we must make certain that the token arrives at the receiver node in the same state every time. If it does not, then the receiver node may transit into a different state in its state transition diagram.

Thus the two main concerns for deterministic single-stepping of a multi-processor Monsoon system are the time of arrival and the order of arrival of tokens.

In the next sections, we describe two methods for single-stepping which will guarantee that the same tokens and the same order of tokens will arrive as inputs to the same states. After each method is discussed, an informal proof is presented, as well as some analysis of the method.

Method 1: Disabling Each Node

Figure 10:
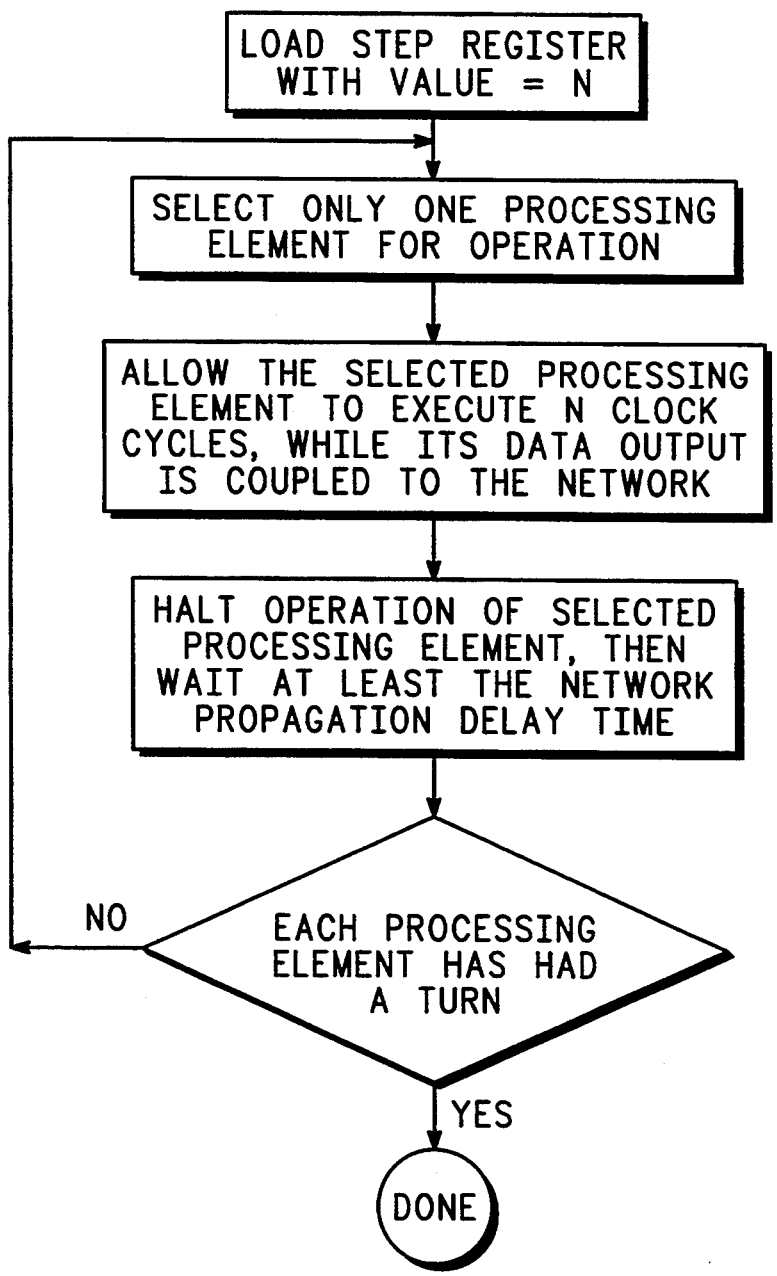
FIG. 10 shows a flow chart illustrating a first method for debugging a multi-processing system in accordance with the invention.

FIG. 10 shows a flow chart illustrating a first method for debugging a multi-processing system in accordance with the invention. In this method of single-stepping, we only allow one processor to execute one or more steps at a time while its data output is coupled to the network and while the other nodes are halted. Once a processor is finished executing N number of steps, we wait a period of time greater than the maximum propagation delay time of the network before single-stepping the next processor. Method 1 is summarized as follows.

Assume that we have a multiple PE system halted in some initial states represented by $S0_0$, $S1_0$, ... etc. We allow $PE_i$ to execute N number of clock cycles while other PE's are halted. After N number of clock cycles, $PE_i$'s state can be represented by Sin. Then we wait a $T_{step} > T_{max}$ delay of the network before executing $PE_{i+1}$ for N number of clock cycles. After $PE_{i+1}$ has finished executing, we again wait and start the process over with $PE_{i+2}$, $PE_{i+3}$, etc. until we have executed all the processors N times.

The informal proof that we obtain the same tokens and the same order of tokens for the input FIFO of a processor can be done by induction.

We first prove that we will have the same inputs when N, the number of single-steps, equal zero. In this case, we can guarantee that the processor will obtain the same inputs and also the same order of inputs because we can simply scan in the inputs by using the scan registers.

If we now assume that this is true for any step N, then we can prove that it is also true for step N+1. To prove this, we have to analyze the flow of tokens after every step is made. Because all the processors, except one, are halted, the tokens on the networks originate only from one source. By having one source of tokens, we would never get two tokens competing to arrive at a processor.

Also because the processor has only one ordered output FIFO, even if two tokens are destined to arrive at the same processor, they would never arrive at the PARC in the same time. Thus the order of arrivals is ensured. After a step is completed, we do not single-step the next processor until we have waited a period of time greater than the maximum propagation delay time of the network.

This will guarantee that the token has traveled through the network and reached its destination. When a token reaches its destination, the receiver PE is guaranteed to be in a certain state because it is halted. By waiting enough time and by letting all the other processors be halted, we can guarantee that the token will arrive at a certain state.

Thus by having the same arrival time and the same order of arrival of tokens, we have proved that the inputs are the same for the processors after taking $N+1$ steps. Once we have proved the initial case of $N=0$ and the case when $N=N+1$, then we have proved that Method 1 will guarantee the same inputs and order of inputs for any number of single-steps.

Operation of Method 1

The following section describes what is implemented in Monsoon to execute Method 1. For Method 1 to work, the user writes the number of steps into the STEP register 85 and stops the node when it has executed that many steps. Only the HEN register 86 is set, because we want the node to halt if it has detected an error and since the rest of the system is not running, we do not have to set the SEN register 96. This is described as follows:

(1) Set the TSTEP bit on the Loading Control register 81 by accessing it from the VME bus. This enables each pulse on the sync network to cause the PE to execute one clock cycle, as opposed to one token.

(2) Set the HEN register 86 to have the HESTP, HEDPE, and HEPBE bits asserted. This is so that the node will latch in the error condition if we have a datapath parity error or presence bit parity error. We also need to assert one bit that halts the PE/IS when the STEP register 85 is decremented to zero. Other bits may be set where appropriate.

(3) Write the number of steps to execute into the STEP register 85. This register is decremented during every clock cycle.

(4) Un-set the UHLT bits in the Shadow Control register 84 of one of the nodes so that upon the arrival of the sync, the contents are transferred into the Control register 83. By not setting this bit, we have told that one node to start executing at full-speed upon the arrival of a sync pulse.

(5) Set the UHLT bit in the Shadow Control register 84 of the rest of the nodes so that when the sync pulse arrives, they are still in their current halt state.

(6) Assert the sync line by writing into the SYNC register. Only one node executes many clock cycles. Every other node is still in a halt state.

Once this one node has halted, we examine the reasons why it has halted by accessing all the Halt Status registers (HST). If the node has halted because of the STEP register 85 returning to zero, then we continue steps (4), (5), and (6) until we have stepped through all 16 nodes. If this node has indicated an error condition, we examine what type of error it is and scan out the states to see if we can detect it. If we cannot detect it from the scanned data, we then decrease the number of steps that we are stepping and single-step from that point on.

This process of single-stepping once for one node in a sixteen PE/IS system would initially require 65 accesses by the user into the VME control logic (16 ns for the configuration register, 16 ns for the HEN register 86, 16 ns for the STEP register, 16 ns for the Shadow Control register 84, and 1 ns for asserting the sync line). Plus we have to wait 115 ns for all the nodes to receive the sync signal, N*100 ns to take the actual single-step, and 500 ns for the network to clear. In total, it takes $65 \cdot T_{access} + (615 + N*100)$ ns to step one node N times.

To step the entire sixteen-node system N times requires $16*(65 \cdot T_{access} + (615 + N*100))$. Assuming that an access from the user meant that the signal will travel from the user's workstation through the Ethernet network to the SBC unit which, in turn, accesses the VME registers, the time $T_{access}$ could be as much as 1–4 ms. If we assume $T_{access} = 4$ ms, then to step a system of sixteen nodes 10 times would require: $16*(65*4 \text{ ms} + (615 + 10*100) \text{ ns}) = 4.16$ seconds. But this number is just $16*(65*4 \text{ ms})$ because the $T_{access}$ is so large compared with the time for the system to take a single-step that we can practically ignore the latter value.

In using this method, one also has to realize the limitation of the interface between the pipeline stages and the asynchronous network. Because the FIFO's can only store 256 tokens, we cannot have each node run 260 steps (256+4 in PARC) because after the nodes are all halted, the worst case scenario is if every PE/IS is sending all of their packets to a single PE/IS. In this case, the receiver's input FIFO will be filled before any node has a chance to finish emptying its output FIFO.

When a node's input FIFO fills up, the input buffers in its corresponding receiver's PARC on the switch unit will fill up which will cause other PARC's on other switch units to stop transmitting. This will cause the entire network to freeze, as no tokens can travel from one node to the other. Thus we need to limit the maximum size of step so that we consider this worst case scenario.

In a sixteen-node system, the maximum number of steps, assuming that one cycle of the PE/IS will produce one token going out to the network, is 17 because if all 15 nodes send 17 tokens to one PE/IS, then that PE/IS will have 255 tokens in its input FIFO. We can generalize this equation in that an $n^{th}$ node system could only be stepped (size of buffer)/$(N-1)$.

Method 2: Disabling the PARC's

Figure 11:
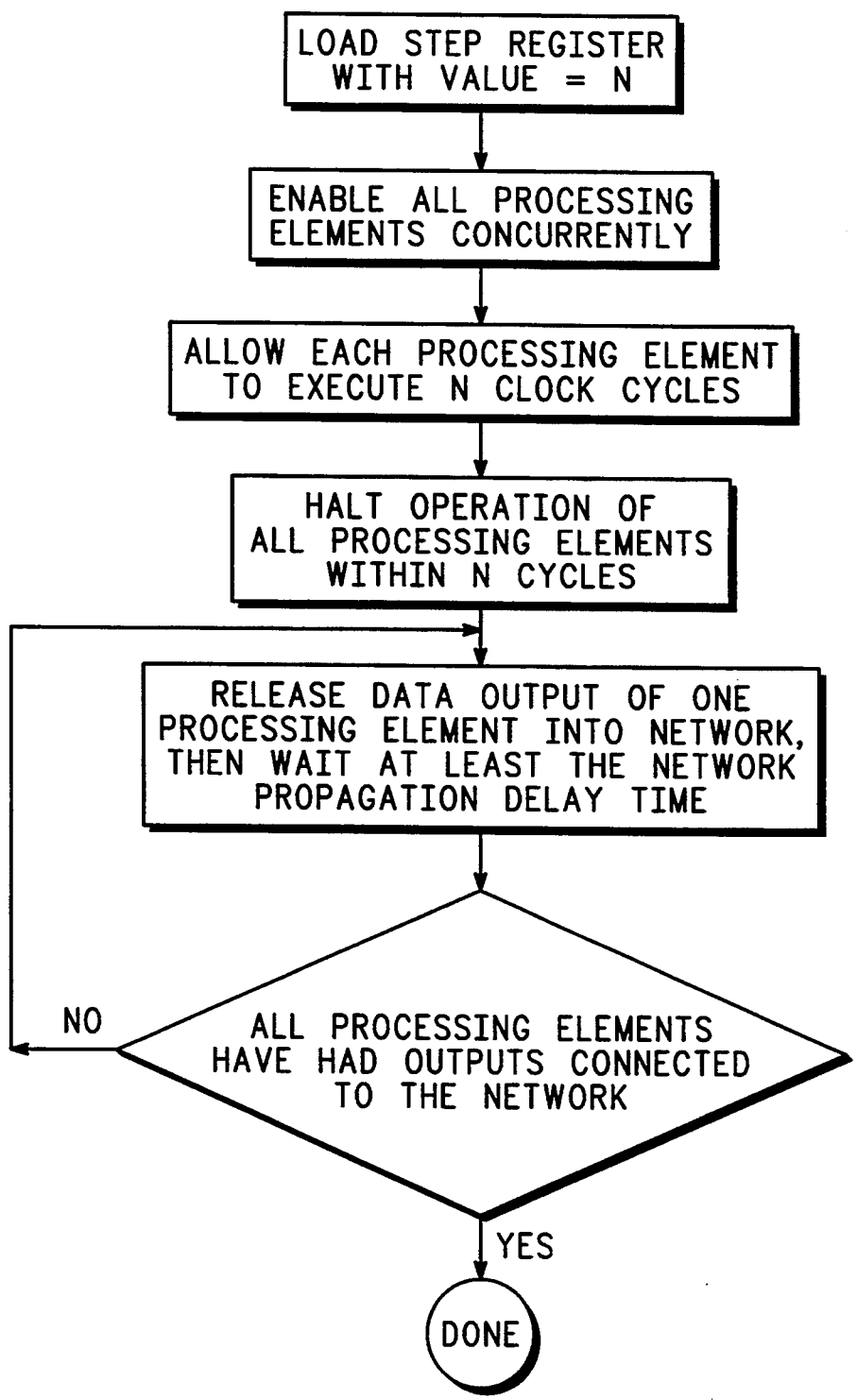
FIG. 11 shows a flow chart illustrating a second method for debugging a multi-processing system in accordance with the invention.

FIG. 11 shows a flow chart illustrating a second method for debugging a multi-processing system in accordance with the invention. This method allows all the processors to take single-steps at the same time in normal speed by first disabling their outputs to the network. Because each processor's output is blocked, all the tokens generated are stored in the output FIFO.

After all the processors have executed N number of steps, the system is halted, and, one at time, each processor's data output is released into the network. To do this, we use a feature on the PARC which allows the user to disable or enable each of the four output ports individually.

When we release the data outputs from each of the processors, we have to delay the time between releases such that we allow one processor's tokens to finish propagating through the network. Method 2 can be expressed as follows.

Assume that we have a multiple PE system halted in some initial states represented by $S0_0, S1_0, \ldots$ etc. We first allow all PE's to execute N number of clock cycles while all of their outputs are disabled. After N number of clock cycles have been executed, we enable output $O_i$ and wait for $PE_i$ to finish transmitting tokens (i.e., wait for $x*T_{max}$ delay of the network where x is the number of tokens or $N*T_{max}$ delay, if x is uncertain.) We then enable output $O_{i+1}$ and wait for $PE_{i+1}$ to finish transmitting tokens, enable output $O_{i+2}$ and wait for $PE_{i+2}$ to finish, etc., until all the PE's have empty output FIFO's.

Again, we informally prove by induction that this method will result in the same tokens and the same order of tokens for the input FIFO. For the trivial case of when N=0, we can guarantee that the processor will obtain the same inputs and also the same order of inputs by simply scanning in the inputs using the scan registers.

If we now assume that this is true for any step N, then we can prove that it is also true for step N+1. To prove this, we again would have to analyze the flow of tokens after every step is made. After every processor has executed N+1 steps and has halted, there would be at most N+1 tokens in the output FIFO.

Because each processor has only one output FIFO and the tokens are arranged in an order depending on when the token was generated, if we allow only one output FIFO to be released then the tokens would get to all the processors in the order which was in the output FIFO. Thus the order of arrivals of tokens would be guaranteed for all processors.

Since we delay an amount of time which is greater than the number of tokens times the propagation delay of the network to release the next output FIFO, we guarantee that the tokens would arrive at their destination. Because we halt all the processors while we are releasing the tokens into the network, we guarantee that the input tokens will arrive before the processor can change state.

Thus we guarantee the time of arrival of tokens. By proving the time of arrival and the order of arrival of tokens are the same, we have proved that the inputs are the same for the processors after taking N+1 steps. Once we have proved the initial case of N=0 and the case when N-N+1, then we have proved that Method 2 will guarantee the same inputs and order of inputs for any number of single-steps.

Operation of Method 2

The following section describes what has to be implemented in detail in Monsoon to execute Method 2. For Method 2 to work, the user again has to write the number of steps into the STEP register 85 and stop the node when it has executed that many steps. Again we only set the HEN register 86 because we want the node to halt if it has detected an error and since the outputs of all the PE's are disabled, we do not need to set the SEN register 96 to prevent contamination. This is described as follows:

(1) Set the TSTEP bit on the Loading Control register 81 by accessing it from the VME bus. This enables each pulse on the sync network to cause the PE to execute one clock cycle, as opposed to one token.

(2) Set the HEN register 86 to have the HESTP, HEDPE, and HEPBE bits asserted. This is so that the node will latch in the error condition if we have a datapath parity error or presence bit parity error. We also need to assert one bit that halts the PE/IS when the STEP register 85 is decremented to zero. Other bits may be set where appropriate.

(3) Write the number of steps to execute into the STEP register 85. This register is decremented during every clock cycle.

(4) Assert a pulse on the synchronization network by writing into the SYNC register.

Once the nodes have all halted, we examine the reasons why they have halted by accessing all the Halt Status registers (HST) on every node. The HST register 87 will latch in the halted condition when a halt has occurred. If all the nodes have halted because of the STEP register 85 returning to zero, then we continue to the next steps (5) and (6) described below.

If one of the nodes has indicated an error condition, we examine what type of error it is and scan out the states to see if we can detect it. If we cannot detect it from the scanned data, we then decrease the number of steps that we are stepping and take one step from that point on.

(5) Write the address and data of the particular output port on the PARC to disable that port. This can be done by writing into the PARCA and PARCD registers on the VME interface.

(6) Assert the sync signal. This will start all the nodes running. Since the PARC is disabled, the output tokens will be filling up the four input buffers of the PARC and then the output FIFO (which can hold up to 256 tokens.)

This process of single-stepping once for a sixteen-node system, for example, would initially require 81 accesses to the VME interface logic by the user (16 for the Loading Control register 81, 16 for the Shadow Control register 84, 16 for setting the HEN register 86, 16 for disabling the PARC, 16 for enabling the PARC one at a time, and 1 for asserting the sync line). In addition, we have to wait 116 ns for the synchronization network, x*500 ns for the propagation of x tokens, and N*100 ns for stepping each processor itself.

Thus the total time to take one step is $81*T_{access}+116$ ns$+x*500+N * 100$ ns. If we assume that x=N in the worst case and $T_{access}$4 ms, then the time it takes for 10 steps is 81 *4 ms+116 ns+10*500 ns +10*100 ns=0.324 seconds. Again this number is essentially $81*T_{access}$ because the $T_{access}$ is so large compared with the time for the system to take a single-step that we can practically ignore the latter value.

SUMMARY

Both methods solve the problem of ordering of tokens by enabling only one node to access the token network at a time.

In the first method, we halt all the nodes except one and allow that processor to execute N clock cycles at normal speed. Then we allow the next processor to execute N clock cycles until it is done. We continue in this fashion until all the nodes have executed N steps.

In the second method, we disable one of the PARC's outputs on all the nodes so that it would not be able to send tokens to the network. We then let all the processors execute N clock cycles at normal speed. After that, we enable the PARC's output one node at a time until all the nodes have emptied the contents of their output FIFO.

Both methods also solved the problem of arrival of tokens by essentially waiting greater than the maximum delay of the network times the number of tokens in the network before any nodes start executing again. By doing so, we are guaranteed that the tokens will arrive as input for the next state change.

If a system has more than two processors, then we have developed two methods which guarantee the arrival and order of tokens. These two methods solve the ordering of tokens problem by only allowing one source of tokens on the network at any time. By delaying the amount of time between steps and having the processors in a halted state, these two methods guarantee the arrival of the same tokens to the same states.

By using either of the two single-step methods, we obtain repeatable state transitions if we have the same initial states. Once we have repeatability in the path of state transitions, we can always arrive at the error state and thus can use many known debugging techniques to aid us in finding the defect.

VME Interface Registers

The VME interface contains several registers which the user can configure to make full use of the debugging logic that exists on every Monsoon unit. To the user, these registers are simply memory locations on the VME bus to which he can write to or read from. The registers are addressed through the VME bus A 16-address map. For some of these registers, the different bit positions represent different actions taken during debugging, as explained in greater below.

Loading Control Register (LCR)

FIG. 12 shows a representation of the loading control register (LCR) 81. The LCR controls, among other things, the selection of which one of eight scan rings can be read from or written to. It also controls the method of single-stepping the nodes. The significant fields are:
TSTEP (Step by Token):
  1: Each step of the node executes one token. The execution of one token may take 8 or more clock cycles to complete.
  0: Each step of the node executes one system clock.
SR[2:0] (Scan ring Number):
  SR[2:0] is the number of the scan ring that will be accessed via the SCAN register.
N/A =not applicable to the scope of this disclosure.
For the two methods mentioned above, we set TSTEP =0. TSTEP=1 is useful when debugging programs.

SCAN Register.

FIG. 13 shows a representation of the SCAN register 82.

This register is used to read or write values into the different scan rings, depending on three bits in the Shadow Control register 84 (SR[2:0]) in the LCR 81. We have to read/write one extra byte when we access the scan rings because we have now increased each scan ring by 8-bits. On a read, the first byte read is always a dummy read because the hardware performs a shift after a read/write has occurred. Similarly with a write, only the last N values are actually written into the scan ring.

Control Register (CR)

FIG. 14 shows a representation of the Control register (CR) 83.
The CR controls many functions of the Monsoon PE, such as single-stepping, halting, and restarting. These bits are described with reference to FIG. 14 as follows:
SS (Single-Step Command) bit.
  1: The PE executes one step regardless of UHLT on SCR.
  0: Do not single-step.
UHLT (Unconditional Halt)
  1: The PE is unconditionally halted.
  0: The PE is running. If the UHLT=1 in the previous cycle, this would mean to start the PE running.
N/A=not applicable to the scope of this disclosure.
By asserting the SS bit, we tell the PE to execute one clock step or one token step depending on the value of the TSTEP bit in the LCR. This bit is usually asserted when the PE is in a halted condition. Because the SS bit is de-asserted after a single-step, we must assert the UHLT in conjunction with the SS bit if we want the PE to stop after executing one step.

Shadow Control Register (SCR)

FIG. 15 shows a representation of the Shadow Control register (SCR) 84.

The SCR 84 is copied into the CR 83 by the hardware whenever a pulse is detected on the synchronization network. Because the bits are copied into the CR 83 and subsequent actions depend on the contents of the SCR 84, the SCR 84 has the same bit configuration as the CR 83 with the same meanings (except that bit 7 of the SCR 84 is a Sync Enable bit). For example, if the UHLT bit in the CR 83 is asserted but the UHLT bit in the SCR 84 is not, upon the arrival of a sync, the PE will start running. If the SS and the UHLT bit of the SCR 84 are asserted, then for every pulse on the synchronization network, the PE will take one step.

STEP Register

FIG. 16 shows a representation of the STEP register.

This 32-bit counter register is decremented before every system clock as long as the UHLT bit of the CR is zero, the UHLT bit of the SCR 84 is zero, and the TSTEP bit in LCR 81 is zero. If the TSTEP bit is set to one, then it will be decremented before a token execution is about to take place (instead of before a system clock cycle.)

When the STEP register 85 goes to zero, depending on whether this condition is enabled in the HEN register 86 or the SEN 96 register, the node will halt and/or assert the sync pulse on the next cycle. To set the number of steps, the node must be halted (UHLT=1 in the CR 83 or SCR 84) before this register is changed, or unpredictable behavior will occur. For example, to allow the node to execute 2 steps requires that the UHLT bit be set to '1', a '2' be placed in the STEP register 85, and the UHLT bit be de-asserted.

Halt Enable Register (HEN)

FIG. 17 shows a representation of the Halt Enable register (HEN) 86. The HEN register 86 contains a set of conditions which may be enabled by the user. For every bit that is set in the register, occurrence of the corresponding condition halts the local PE by de-asserting the clock enable of all the scan registers. The conditions which caused the halt are also latched in the HST register 87. By setting the bits in this register, a halt will only halt the local PE. No sync pulse will be generated. The bits involved in this register are shown in FIG. 17 and are defined as:
HESTP (Step Counter Enable)
  1: Halt if the STEP register 85 is decremented from 1 to 0.
  0: Do not halt on any count of the STEP register 85.
HEDPBP (Datapath Breakpoint)
  1: Halt if a particular token has entered the top of the pipeline.
  0: Do not halt even if we detect that token.
HEDPE (Data Path Parity Error)
  1: Halt if we detect a parity error on the data bus lines of the pipeline.
  0: Do not halt even if we detect a parity error.
HEPBE (Presence Bit Error)
  1: Halt if we detect a parity error in the memory.
  0: Do not halt even if we detect a parity error.

HEL2BP (Level 2 Breakpoint)
(Each token is decoded into an instruction and data. A token can also be decoded into a 'halt token' which can halt the PE.)
 1: Halt the PE if a 'halt token' has been decoded as such.
 0: Do not halt even if we have decoded a 'halt token'.
HESQF (System Queue Full)
 1: Halt if the system queue is full.
 0: Do not halt if the system queue is full.
HEUQF (User Queue Full)
 1: Halt if the user queue is full.
 0: Do not halt if the user queue is full.
HESOF (Statistics Counter Overflow)
(There are various statistic counters which reside on the hardware of the PE. This is used to detect if any one of them has overflowed.)
 1: Halt if overflow is detected while incrementing any statistics counters.
 0: Do not halt if overflow is detected.

Halt Status Register (HST)

FIG. 18 shows a representation of the Halt Status register (HST) 87. The HST 87 indicates the condition which caused the halt. It will also contain other conditions which may have occurred but are masked by the HEN 86 from halting the PE. For instance, if the HEBPE bit is set to '0', then even if we have detected a special token at the top of the pipeline, the PE would not be halted. But if there was a parity error on the data bus which is enabled by the HEN 86 at the same time that this special token has entered the pipeline, then the HBPE and the HDPE would be set. The HST register 87 contains the same bits as the HEN register 86.

Status Register (SR)

FIG. 19 shows a representation of the Status register (SR) 88. The SR 88 provides an indication of the status of the hardware on the PE. These are useful for debugging purposes as they may indicate sources of error. This register is different from the HEN register 86 in that it is a read-only register and cannot be used to detect error conditions. These bits are shown in FIG. 19 and are described as follows:
CHLT (Conditional Halt)
 1: Halt Status bits are latched; an enabled halt condition has been detected.
 0: Halt Status bits are not latched; no enabled halt condition has been detected.
SQE (System Queue Empty)
 1: The system queue is empty.
 0: The system queue is not empty.
UQE (User Queue Empty)
 1: The user queue is empty.
 0: The user queue is not empty.
IFE (Input FIFO Empty)
 1: The input FIFO is empty.
 0: The input FIFO is not empty.
IFF (Input FIFO Full)
 1: The input FIFO is full.
 0: The input FIFO is not full.
OFE (Output FIFO Empty)
 1: The output FIFO is empty.
 0: The output FIFO is not empty.
OFF (Output FIFO Full)
 1: The output FIFO is full.
 0: The output FIFO is not full.

SYNC Register

FIG. 20 shows a representation of the SYNC register 89.

SYNC register 89 is an 8-bit write-only register. SYNC register 89 enables the user to send a pulse on the synchronization network without waiting for an enabled halt condition established in the SEN register 96. This is useful when we have to take "snap-shots" of the system but we do not have any event which we can trigger a breakpoint condition from. A write to any bit of SYNC register 89 asserts the SYNC pulse which will only be received by the local unit after it has been delayed by the propagation delay of the token network. Depending on the contents of the SCR 84, the processor may halt, single-step once, or start. The data value written is ignored.

PARCA and PARCD Registers

FIG. 21 shows a representation of the STOP register 90 in the PARC register. The PARC has 64 registers which control its various functions. The PARCA register is used to select which one of the 64 registers on the PARC should be accessed via the PARCD register. This effectively maps the 64 PARC registers into two VME bus locations. On the PARCA register, only the last 6 bits from the eight are used.

In Method 2, we are interested in turning on and off selected ports of the PARC. This is done by writing a 0×FF into the PARCA register (accessing the STOP register 90 in the PARC). Thus to only turn off the output 2 of the PARC, for instance, we would write 0b01000000 to the PARCD register.
Send[3:0] (Turn on/off the outputs of PARC)
 1: Port will transmit tokens.
 0: Port will not transmit tokens.
Receive[3:0] (Turn on/off the inputs of PARC)
 1: Port will receive tokens.
 0: Port will not receive tokens.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a data processing system comprising a plurality of processing elements coupled to a network wherein said system is an explicit token storage dataflow system, and wherein the output of each processing element comprises at least one token, a method for debugging the operation of said system, wherein said method comprises the steps of:
 (a) disabling the operation of each processing element except one;
 (b) allowing said one processing element to execute N number of steps while its output is coupled to the network;
 (c) halting the operation of said one processing element;
 (d) allowing sufficient time for said one processing element's output to finish propagating through the network and
 (e) repeating steps (a) through (d) until each processing element has operated.

2. The method for debugging a data processing system recited in claim 1, wherein each step represents the execution of a token.

3. In a data processing system comprising a plurality of processing elements coupled to a network wherein said system comprises a step register, a method for debugging the operation of said system, wherein said method comprises the steps of:
   (a) disabling the operation of each processing element except one;
   (b) allowing said one processing element to execute N number of steps while its output is coupled to the network by loading the value N into said step register for determining said number of steps;
   (c) halting the operation of said one processing element;
   (d) allowing sufficient time for said one processing element's output to finish propagating through the network; and
   (e) repeating steps (a) through (c) until each processing element has operated.

4. In a data processing system comprising a plurality of processing elements coupled to a network wherein said system comprises a control register, a method for debugging the operation of said system, wherein said method comprises the steps of:
   (aa) loading at least one bit in said control register for determining at least one characteristic of said debugging method;
   (a) disabling the operation of each processing element except one;
   (b) allowing said one processing element to execute N number of steps while its output is coupled to the network;
   (c) halting the operation of said one processing element;. (d) allowing sufficient time for said one processing element's output to finish propagating through the network; and
   (e) repeating steps (aa) through (d) until each processing element has operated.

5. The method for debugging a data processing system recited in claim 4, wherein said system is an explicit token storage dataflow system, and wherein the output of each processing element comprises at least one token.

6. The method for debugging a data processing system recited in claim 5, wherein said at least one bit in said control register determines that said processing element executes one token.

7. The method for debugging a data processing system recited in claim 4, wherein said at least one bit in said control register determines that said processing element executes one clock cycle.

8. The method for debugging a data processing system recited in claim 4, wherein said system comprises a shadow control register and wherein said method comprises the step of copying the contents of said shadow control register into said control register upon the occurrence of a predetermined condition in said data processing system.

9. In a data processing system comprising a plurality of processing elements coupled to a network wherein said system comprises a halt enable register a method for debugging the operation of said system, wherein said method comprises the steps of;
   (aa) loading at least one bit in said halt enable register for halting the operation of said system upon the occurrence of a predetermined condition in said data processing system;
   (a) disabling the operation of each processing element except one;
   (b) allowing said one processing element to execute N number of steps while its output is coupled to the network;
   (c) halting the operation of said one processing element;
   (d) allowing sufficient time for said one processing element's output to finish propagating through the network; and
   (e) repeating steps (aa) through (d) until each processing element has operated.

10. In a data processing system comprising a plurality of processing elements coupled to a network wherein said system is an explicit token storage dataflow system, and wherein the output of each processing element comprises at least one token, a method for debugging the operation of said system, wherein said method comprises the steps of:
    (a) disconnecting the output of each processing element from the network;
    (b) allowing all processing elements to execute N number of steps;
    (c) halting the operation of all processing elements;
    (d) coupling the output of one of said processing elements to the network, allowing sufficient time for such processing element's output to finish propagating through the network; and
    (e) repeating step (d) until each processing element has coupled its output to the network.

11. The method for debugging a data processing system recited in claim 10, wherein each step represents the execution of a token.

12. In a data processing system comprising a plurality of processing elements coupled to a network, wherein said system comprises a step register, a method for debugging the operation of said system, wherein said method comprises the steps of:
    (a) disconnecting the output of each processing element from the network;
    (b) allowing all processing elements to execute N number of steps by loading the value N into said step register for determining said number of steps;
    (c) halting the operation of all processing elements;
    (d) coupling the output of one of said processing elements to the network, allowing sufficient time for such processing element's output to finish propagating through the network; and
    (e) repeating step (d) until each processing element has coupled its output to the network.

13. In a data processing system comprising a plurality of processing elements coupled to a network wherein said system comprises a control register, a method for debugging the operation of said system, wherein said method comprises the steps of:
    (aa) loading at least one bit in said control register for determining at least one characteristic of said debugging method;
    (a) disconnecting the output of each processing element from the network;
    (b) allowing all processing elements to execute N number of steps by loading the value N into said step register for determining said number of steps;
    (c) halting the operation of all processing elements;
    (d) coupling the output of one of said processing elements to the network, allowing sufficient time for such processing element's output to finish propagating through the network; and (e) repeating step (d) until each processing element has coupled its output to the network.

14. The method for debugging a data processing system recited in claim 13, wherein said system is an explicit token storage dataflow system, and wherein the output of each processing element comprises at least one token.

15. The method for debugging a data processing system recited in claim 14, wherein said at least one bit in said control register determines that said processing elements execute one token.

16. The method for debugging a data processing system recited in claim 13, wherein said at least one bit in said control register determines that said processing elements execute one clock cycle.

17. The method for debugging a data processing system recited in claim 13, wherein said system comprises a shadow control register and wherein said method comprises the step of copying the contents of said shadow control register into said control register upon the occurrence of a predetermined condition in said data processing system.

18. In a data processing system comprising a plurality of processing elements coupled to a network wherein said system comprises a halt enable register, a method for debugging the operation of said system, wherein said method comprises the steps of:
(aa) loading at least one bit in said halt enable register for halting the operation of said system upon the occurrence of a predetermined condition in said data processing system;
(a) disconnecting the output of each processing element from the network;
(b) allowing all processing elements to execute N number of steps by loading the value N into said step register for determining said number of steps;
(c) halting the operation of all processing elements;
(d) coupling the output of one of said processing elements to the network, allowing sufficient time for such processing element's output to finish propagating through the network: and
(e) repeating step (d) until each processing element has coupled its output to the network.

* * * * *